United States Patent Office 3,475,520
Patented Oct. 28, 1969

---

3,475,520
PHOSPHORUS DIFLUORIDE DERIVATIVES AND PRODUCTION THEREOF
Ronald A. Mitsch, St. Paul, Minn., assignor to Minnesota Mining and Manufacturing Company, St. Paul, Minn., a corporation of Delaware
No Drawing. Filed Feb. 17, 1966, Ser. No. 528,085
Int. Cl. C08f 9/14, 9/26; A01n 9/36
U.S. Cl. 260—940
14 Claims

ABSTRACT OF THE DISCLOSURE

Pentavalent organic phosphorus difluorides containing organic groups bonded to the phosphorus atom through heteroatoms which are pest control agents and/or valuable chemical intermediates, and the process for their preparation by reaction of a substituted trivalent phosphorus compound with difluorodiazirine.

---

This invention relates to novel organophosphorus fluorides and more particularly to difluoro derivatives of organophosphorus compounds, and to a process of preparing said organophosphorus difluorides.

Pentavalent organic phosphorus compounds containing fluorine are known and have achieved considerable success as chemical intermediates, and insecticides, and for other purposes. Pentavalent organic phosphorus difluorides containing alkyl or aryl groups are known and have been prepared generally by reaction of phosphine sulfides with antimony trifluoride and by reaction of phosphines with tetrafluorohydrazine or sulfur tetrafluoride.

The attempted preparation of trimethoxyphosphorus difluoride, $(CH_3O)_3PF_2$, from the reaction of $$(CH_3O)_3P=S$$

with antimony trifluoride, has been described to be unsuccessful by R. Schmutzler in Inorganic Chemistry, vol. 3, page 421 (1964). So far as is known to applicant, no organic phosphorus difluorides, having the organic groups bonded to the phosphorus atom through heteroatoms, have been known.

An object of this invention is to provide novel and useful organic phosphorus difluorides containing organic groups bonded to the phosphorus atom through heteroatoms.

A further object of the invention is to provide a novel process for the preparation of organic phosphorus difluorides. Other objects of the invention will become apparent from the disclosures hereinafter made.

The novel compounds of the invention are characterized by the presence of two fluorine atoms covalently bonded to the phosphorus, while the remaining valences of the pentavalent phosphorus are substituted by heteroatoms which in turn are covalently bonded to organic groups.

The compounds of the invention are further characterized by having the general formula:

wherein A, B and C are R—O—, R—S— or R'R'N—, R represents alkyl, aryl, aralkyl, alkaryl or cycloalkyl radicals, two of said R groups taken together with the linking heteroatom and the phosphorus atom may form a 5 to 6 membered ring; R' represents alkyl or aryl, and both R' groups taken with the nitrogen atom form a piperidino radical; and each R and R' radical has from 1 to 12 carbon atoms.

These R and R' radicals can be substituted as set forth hereinafter, and can contain heteroatoms such as nitrogen, oxygen and sulfur, etc. Thus, they can be hydroxyalkyl, alkoxyalkyl, mercaptoalkyl, alkylmercaptoalkyl, alkoxyaryl, halogenated, etc., as will be apparent to the art from the more specific disclosures which follow.

For convenience, the compounds are named as phosphorus difluorides. Thus, the compound $(C_6H_5O)_3PF_2$ is named triphenoxyphosphorus difluoride and the compound $(C_{12}H_{25}S)_3PF_2$ is named trilauryltrithiophosphorus difluoride (or trilaurylmercaptophosphorus difluoride).

The compounds of this invention possess utility as pest-control agents and/or valuable chemical intermediates. For example, reaction of the compound

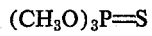

with hydrogen sulfide results in the formation of methyl parathion, an important insecticide. Hydrolysis of the phosphorus difluorides of this invention results in the formation of phosphates, trithiophosphates or phosphorus triamides, all well known solvents, plasticizers and corrosion inhibitors. Certain of the compounds of the invention can also be used as herbicides and petroleum additives.

The phosphorus difluorides of the above general formula are readily prepared by the reaction of a trivalent phosphorus compound of the general formula:

in which A, B and C have the meaning shown above, with difluorodiazirine, having the formula:

This compound is disclosed in a publication by R. A. Mitsch, J. Heterocyclic Chem., 1, 59 (1964). The course of the reaction is shown by the following general equation:

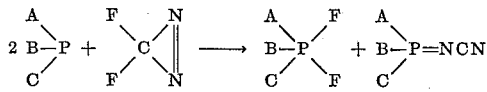

The stoichiometry of the reaction thus requires two moles of trivalent phosphorus compound per mole of difluorodiazirine. Varying the stoichiometric quantities of the reactants used has little effect on the products obtained in the reaction, the yield being dependent on the amount of reagent present in smallest amount.

The process of the invention is conveniently carried out by dissolving the trivalent phosphorus compound in a solvent in which it has at least moderate solubility and which is inert with respect to the reactants and products of the reaction at the temperature employed. In the case of a batch reaction, the difluorodiazirine, which is a gas boiling at about −91° C., is then introduced, e.g., by condensation or by pressurization. In a flow-through system the difluorodiazirine is bubbled through a solution of the selected trivalent phosphorus compound in an inert solvent. The reaction is self-initiating and results in the formation of a mixture of the substituted pentavalent phosphorus difluoride and the corresponding N-cyanophosphorus imide.

The time and temperature required for the reaction vary widely, depending on the reactivity of the trivalent phosphorus reactant, the quantity of the reactants utilized and the dilution.

The reaction is preferably carried out at a temperature within the range from about −100° C. to +100° C. In the case of highly reactive trivalent phosphorus compounds, the reaction is conveniently run at −78° C. in a Dry Ice cooled reactor whereas with less reactive reagents stirring at room temperature is convenient. However, temperatures outside of the above range can be employed depending upon the type of reactant and solvents utilized. Use of a pressure vessel may be required, as will be apparent to the art from the highly volatile nature of the difluorodiazirine.

The reaction time is not critical but should be of sufficient length to permit the reaction to be completed. In most cases, one hour to one week is sufficient to give a useful yield. Since difluorodiazirine is a gas, even at −78° C., it is convenient to monitor the extent of completion of the reaction by infrared examination of the volatile components of the mixture. In this way, the course of the reaction can be followed and when the characteristic absorption peak of the diazirine ring disappears or is greatly weakened, the process can be terminated.

The products of the reaction are isolated by distillation, column chromatography or crystallization and combinations thereof. The two organophosphorus derivatives which are products of the reaction ordinarily have widely differing physical properties and are easily separated from each other and from the starting material.

The trivalent phosphorus compounds useful as starting materials for the preparation of phosphorus difluorides are available commercially or can be prepared by techniques of synthesis well known to the art. Procedures for preparation of these materials are set forth in "Organophosphorus Compounds," G. M. Kosolapoff, John Wiley and Sons, Inc., New York, N.Y., 1950.

In general, the trivalent phosphorus reagents useful as starting materials vary considerably in their reactivity with difluorodiazirine. Starting materials which are substituted with a multiplicity of electron-donating groups, such as methoxy and dialkylamino groups, are highly reactive. In fact, compounds such as trimethylphosphite or tris(dimethylamino)phosphine can react explosively with difluorodiazirine if suitable precautions of cooling or dilution are not employed. On the other hand, trivalent phosphorus compounds which are substituted with electron-withdrawing substituents are sluggish to react.

The organic radicals of the trivalent phosphorus starting compounds can be unsubstituted or substituted. Among the substituents which can be present are halo, nitro, cyano, cyanato, keto, carboxyl, acyl, carboalkoxy, hydroxyl, unsaturated hydrocarbon and the like. These substituents do not interfere with the phosphorus difluoride-forming reaction, and are not lost. Therefore, the final products also can contain such substituents in the organic radicals of the A, B and C groups.

The inert solvent which is chosen for the preparation of any particular compound according to the invention will depend upon the trivalent phosphorus reactant and the conditions to be used. That is, under the conditions used it must be liquid, must be capable of dissolving at least a moderate amount of the reactants, and must be inert with respect to the materials present. Among the suitable solvents are dichloromethane, carbon tetrachloride, chloroform, acetonitrile, benzene, chlorobenzene, diglyme, acetone, etc. The boiling point of the solvent is not critical for the reaction, although the lower boiling solvents are desirable because they facilitate isolation and recovery of the phosphorus difluoride products.

The phosphorus difluorides of the invention are generally colorless liquids or solids. They can be purified by high-vacuum distillation, recrystallization, solvent extraction, sublimation, solid-liquid absorption column chromatography and other related known techniques.

The phosphorus difluoride compounds of the invention are conveniently identified by the use of fluorine nuclear magnetic resonance spectroscopic measurements. The fluorine atoms bonded to phosphorus can be distinguished by their shielding values expressed in $\phi$ units, employing trichlorofluoromethane as the standard, as described by G. Filipovich and G. V. D. Tiers (Journal of Physical Chemistry, vol. 63, pp. 761–762, 1959); the $\phi^*$ values defined there by the authors are here given simply as $\phi$ values. The hetero-substituted phosphorus difluorides of the invention usually exhibit shielding values in the range of about 30 to 100$\phi$, and especially in the 50 to 90$\phi$ region. The nuclear magnetic resonance spectra of the compounds of the invention are especially diagnostic for the presence of fluorines bonded to phosphorus because the fluorine absorptions in the 30 to 100$\phi$ region appear as doublets, owing to spin-spin coupling with the phosphorus atom. In general the phosphorus-fluorine couplings are in the range of 550 to 750 cycles per second for fluorines in the axial positions and 900 to 1000 cycles per second for fluorines in the equatorial positions of the trigonal bipyramid pentavalent phosphorus structure.

Specific examples of the phosphorus difluorides of the invention include:

TABLE 1

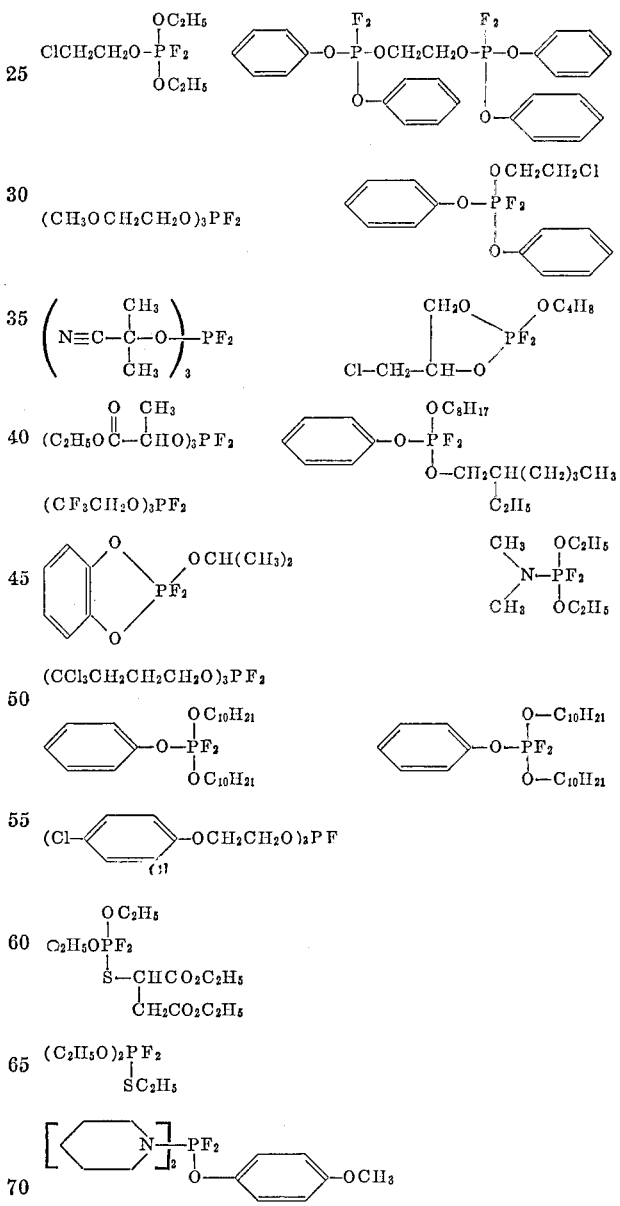

In order to disclose more clearly the process and compounds of the invention in the best mode presently contemplated, a number of specific examples will now be given. All parts are by weight unless otherwise designated.

EXAMPLE 1

This example illustrates the procedure used in preparing the compounds of the invention from substituted phosphites and difluorodiazirine, where all of the latter reactant is added initially and the process operates as a batch process. Trimethylphosphite is to be understood as representative of a broad range of methylene chloride-soluble phosphites. It will also be understood that the solubility of the selected phosphite will determine the solvent to be used in the reaction mixture, while the temperature employed, and the time during which the reaction is carried out, depend both upon the reactivity of the substituted phosphite which is employed and the yield required.

A solution of 5.12 grams of redistilled trimethylphosphite and 20 ml. of methylene chloride is placed in a 75-ml. glass reactor fitted with a polytetrafluoroethylene valve and containing a magnetic stirring bar. The solution is cooled to liquid nitrogen temperature, de-gassed by reducing the pressure in the reactor to less than 0.1 mm. of mercury, and 2.0 grams of difluorodiazirine are added by condensing the gas into the cold reactor. The apparatus and the reaction mixture are then allowed to warm to room temperature, and stirring is begun and continued for 24 hours.

At this time the methylene chloride solvent is removed under partial vacuum, followed by fractional distillation of the residue in a vacuum system, through traps cooled to $-35°$ and $-196°$ C. The $-35°$ C. receiver contains 1.04 g. of essentially pure trimethoxyphosphorus difluoride, a colorless liquid, $n_D^{23.5}=1.3760$. The product is identified by infrared and $F^{19}$ nuclear magnetic resonance spectroscopy. The $F^{19}$ spectrum shows the presence of both axial and equatorial fluorine atoms. The axial fluorines appear as a doublet at $72.8\phi$ ($J_{P-F}=706$ cps.) and the equatorial fluorines appear as a doublet at $86.1\phi$ ($J_{P-F}=972$ cps.) in the ratio of 5 to 1.

The residue in the distillation flask contains N-cyano-O,O,O-trimethylphosphoroimidate boiling at $69°/0.160$ mm.

EXAMPLE 2

This example is exemplary of the use of trivalent phosphorus compounds to which nitrogen atoms are bonded directly to the phosphorus, as starting materials. According to the procedure outlined in Example 1, 6.52 grams of tris(dimethylamino)phosphine, made by the procedure of Burg et al., J. Am. Chem. Soc., 80, 1107 (1958), dissolved in 25 ml. of methylene chloride is reacted in a batch process by stirring with 2.0 grams of difluorodiazirine at $-78°$ C. The low temperature is extremely important in this reaction owing to the high reactivity of the phosphorus compound. After stirring for 18 hours, the methylene chloride solvent is removed by distillation. The residue is heated to 90° C. under vacuum and the product, tris(dimethylamino)phosphorus difluoride, is removed by fractionation. Tris(dimethylamino)phosphorus difluoride, a colorless liquid, B.P. $32°-36°$ C./3 mm., is identified by infrared and $F^{19}$ nuclear magnetic resonance spectroscopy. The $F^{19}$ nuclear magnetic resonance spectrum shows a doublet at $53.5\phi$ ($J_{P-F}=707$ cps.).

The residue from the reaction contains N-cyanotris(dimethylamino)phosphinimide, melting at $77.8°-79°$ C.

EXAMPLE 3

The compounds of the invention can also be prepared by reaction of the substituted trivalent phosphorus derivatives with tetrafluorohydrazine. The following is a specific example of the preparation of a phosphorus difluoride by this process, tris(dimethylamino)phosphorus difluoride being exemplary of the trivalent phosphorus derivatives which can be used to make the compounds of the invention.

A solution of 0.489 g. of tris(dimethylamino)phosphine and 20 ml. of diethyl ether is placed in a 50-cc. glass reactor fitted with a polytetrafluoroethylene needle valve and containing a magnetic stirring bar. The solution is cooled to liquid nitrogen temperature, and 0.42 gram of tetrafluorohydrazine is condensed into the cold reactor under vacuum as in Example 1. The reactor and reaction mixture are then allowed to warm to $-78°$ C. and then stirring is begun at that temperature and continued for 1 day.

At the end of this time, the solvent and excess $N_2F_4$ are removed under partial vacuum. Purification by fractional distillation affords a 61 percent yield of tris(dimethylamino)phosphorus difluoride which was spectroscopically identical to that prepared in Example 2.

EXAMPLE 4

This example illustrates the procedure used in preparing compounds of the invention from substituted trithiophosphites.

S,S,S-tributyltrithiophosphite is to be understood as representative of a broad range of methylene chloride-soluble thiophosphites. Depending of course on their solubility, the thiophosphites can be dissolved in other inert solvents for use in the process. The temperature employed, and the time during which the reaction is carried out, depend both upon the reactivity of the substituted thiophosphite which is employed and the yield required.

Following the procedure outlined in Example 1, a solution of 11.92 grams of tributyltrithiophosphite dissolved in 40 ml. of methylene chloride is reacted with 2.0 grams of difluorodiazirine. The reaction mixture is stirred at room temperature for 5 days, after which the solvent is removed under vacuum. By fractional distillation of the residue in vacuo, there is obtained pure tributyltrithiophosphorus difluoride, $(C_4H_9S)_3PF_2$, boiling at $123°/0.05$ mm. pressure, $n_D^{24}=1.5232$. The $F^{19}$ nuclear magnetic resonance spectrum of the purified product shows a doublet centered at $72.3\phi$ ($J_{P-F}=713$ cps.).

EXAMPLE 5

This example serves to illustrate the reaction with difluorodiazirine of benzene-soluble phosphorus compounds as starting materials.

A solution of 7.91 grams of triphenylphosphite and 10 ml. of benzene is added to a 75 cc. glass reactor fitted with a polytetrafluoroethylene needle valve and containing a magnetic stirring bar. The solution is cooled to $-196°$ C., and 1.0 gram of difluorodiazirine is added by condensation under vacuum as in Example 1. The apparatus and the reaction mixture are then allowed to warm to room temperature, and stirring is begun and continued for one week. At this time, fractional distillation-condensation through $-78°$ and $-196°$ C. traps is employed to recover 40.5 percent of unreacted difluorodiazirine. The yellow-colored residue is extracted with three 10-ml. portions of pentane. Evaporation of the pentane extracts yields 3.49 grams (44 percent) of unreacted triphenylphoshite.

The residue from the pentane extraction is taken up in chloroform and separated into its components by liquid column chromatography on silica gel. Elution with a mixture of chloroform and ethylacetate affords relatively pure triphenoxyphosphorus difluoride, a white solid, having a doublet at $73.0\phi$ ($J_{P-F}=721$ cps.) in the $F^{19}$ nuclear magnetic resonance spectrum. The material is easily hydrolyzed to triphenylphosphate.

EXAMPLE 6

The following is a specific example of the preparation of a phosphorus difluoride which is substituted by groups bonded to the phosphorus through unlike heteroatoms. Bis(dimethylamino)methoxyphosphine,

$$[(CH_3)_2N]_2POCH_3$$

is used as exemplary of the mixed trivalent phosphorus derivatives which can be used to make the compounds of the invention.

Bis(dimethylamino)methoxyphosphine is prepared by the reaction of bis(dimethylamino)phosphorus chloride with methanol in the presence of triethylamine. Purification by distillation affords bis(dimethylamino)methoxyphosphine boiling at 53°–54°/24 mm., $n_D^{23}=1.4474$.

Following the procedure of Example 1, a solution of 6.0 grams of bis(dimethylamino)methoxyphosphine dissolved in 25 ml. of methylene chloride is reacted with 2.0 grams of difluorodiazirine at −78° C. with stirring. Stirring is continued for about 12 hours as the reactor is allowed to warm slowly to room temperature.

Excess difluorodiazirine and the methylene chloride solvent are then removed from the reactor under reduced pressure. Fractional distillation-condensation of the residue using a vacuum system employing −35° and −196° C. receivers results in the isolation of 1.7 grams of the desired product in the −35° C. receiver. Distillation of this material yields pure bis(dimethylamino)methoxyphosphorus difluoride as a colorless liquid, boiling at 39°–40°/4 mm., $n_D^{23}=1.4069$. The $F^{19}$ nuclear magnetic resonance spectrum of $[(CH_3)_2N]_2PF_2OCH_3$ shows the presence of both axial and equatorial fluorines. The axial doublet is centered at 55.5φ ($J_{P-F}=715$ cps.) whereas the equatorial fluorines doublet is centered at 83.0φ ($J_{P-F}=952$ cps.).

The residue after fractionation comprises N-cyano-bis-(dimethylamino)methoxyphosphinimide.

The following table further illustrates preparation of specific phosphorus difluoride compounds of the invention. In each case, the starting material is the respective trivalent phosphorus derivative having the same substituent radicals attached to the phosphorus atom as are found in the product. Essential process conditions are given. Column choromatography, distillation, or recrystallization from suitable solvents is employed for purification purposes.

tached and the phosphorus atom may form a 5 to 6 membered ring, R' represents alkyl or aryl; and each R and R' radical has from 1 to 12 carbon atoms.

2. A compound of the formula

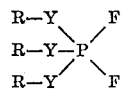

wherein R represents the same or different alkyl, aryl, aralkyl, alkaryl or cycloalkyl radicals, Y represents a linking atom of the group consisting of —O— and —S—, and two of said R groups taken together with the linking atoms to which they are attached and the phosphorus atom may form a 5 to 6 membered ring; and each R radical has from 1 to 12 carbon atoms.

3. A compound according to claim 2, having the formula

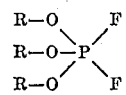

wherein R represents alkyl, aryl, aralkyl, alkaryl or cycloalkyl radicals, and two of said R—O— groups taken together with the phosphorus atom to which they are attached may from a 5 to 6 membered ring; and each R radical has from 1 to 12 carbon atoms.

TABLE II

| Product | Process Conditions | |
|---|---|---|
| | Temp./Time | Solvent |
| Example: | | |
| 7 ........ $(C_2H_5O)_3PF_2$ | Liquid ........ 22° C./100 hrs .... | Carbon tetrachloride. |
| 8 ........ $(C_{12}H_{25}S)_3PF_2$ | ...do........ 22° C./7 days .... | Chloroform. |
| 9 ........ $O_2N-\underset{\underset{OCH_3}{|}}{\overset{\overset{OCH_3}{|}}{\bigcirc}}-OPF_2$ | Solid .......... do .......... | Benzene. |
| 10 ........ $N\equiv C-\underset{\underset{OCH_3}{|}}{\overset{\overset{OCH_3}{|}}{\bigcirc}}-OPF_2$ | ...do.......... do .......... | Methylene dichloride. |
| 11 ........ $Cl-\underset{\underset{Cl}{|}}{\overset{}{\bigcirc}}-\underset{\underset{OC_2H_5}{|}}{\overset{\overset{OC_2H_5}{|}}{O-PF_2}}$ | Semi-solid ........ do .......... | Benzene. |
| 12 ........ $\begin{array}{c}CH_3\\ \diagdown\\ N-PF_2\\ /\quad |\\ CH_3\quad N\\ \diagup\diagdown\\ CH_3\quad CH_3\end{array}\quad OCH_2CH_2SC_2H_5$ | Liquid ........ −78° C./24 hrs ... | Methylene dichloride. |

What is claimed is:
1. A compound of the formula

wherein A and B are R—O—, R—S— or R'R'N—, C is R—O— or R—S—, R represents alkyl, aryl, aralkyl, alkaryl or cycloalkyl radicals, and two of said R groups taken together with the linking atom to which they are at- 4. A compound according to claim 2, having the formula

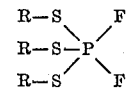

wherein R represents alkyl, aryl, aralkyl, alkaryl or cycloalkyl radicals, and two of said R—S— groups taken together with the phosphorus atom to which they are attached may form a 5 to 6 membered ring; and each R radical has from 1 to 12 carbon atoms.

5. A compound according to claim 1, wherein A and B are R'R'N radicals and C is an R—O— group having the formula

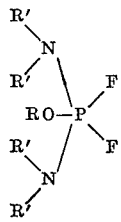

wherein R represents alkyl, aryl, aralkyl, alkaryl or cycloalkyl radicals, and R' represents alkyl or aryl; and each R and R' radical has from 1 to 12 carbon atoms.

6. The compound triphenoxyphosphorus difluoride according to claim 2, wherein A, B and C are phenoxy groups.

7. The compound trimethoxyphosphorus difluoride according to claim 2, wherein A, B and C are methoxy groups.

8. The compound tributyltrithiophosphorus difluoride according to claim 2, wherein A, B and C are butylmercapto groups.

9. The compound diethoxy(2-ethylthioethoxy)phosphorus difluoride according to claim 2, wherein A and B are ethoxy groups and C is a 2-ethylthioethoxy group.

10. The compound dimethoxy(4-nitrophenoxy)phosphorus difluoride according to claim 2, wherein A and B are methoxy groups and C is a 4-nitrophenoxy group.

11. The compound dimethoxy(4-cyanophenoxy)phosphorus difluoride according to claim 2, wherein A and B are methoxy groups and C is a 4-cyanophenoxy group.

12. The compound diethoxy (2,4-dichlorophenoxy) phosphorus difluoride according to claim 2, wherein A and B are ethoxy groups and C is a 2,4-dichlorophenoxy group.

13. The compound bis(dimethylamino)(2-ethylthioethoxy)-phosphorus difluoride according to claim 1, wherein A and B are dimethylamino groups and C is a 2-ethylthioethoxy group.

14. A process for the production of substituted phosphorus difluorides which comprises the step of reacting a compound of the formula

wherein A and B are R—O—, R—S— or R'R'N—, C is R—O— or R—S—, R represents alkyl, aryl, aralkyl, alkaryl or cycloalkyl radicals, and two of said R groups taken together with the phosphorus atom may form a 5 to 6 membered ring; R' represents alkyl or aryl; and each R and R' radical has from 1 to 12 carbon atoms, with difluorodiazirine, in the presence of an inert solvent.

References Cited

UNITED STATES PATENTS 1,983,588   12/1934   Adler et al. _____ 260—960 X
2,904,588   9/1959    Smith.

CHARLES B. PARKER, Primary Examiner

R. L. RAYMOND, Assistant Examiner

U.S. Cl. X.R.

252—46.6, 46.7, 49.8; 260—293, 293.4, 294.3, 294.7, 543, 551, 928, 936, 937, 942, 947, 948, 950, 951, 953, 954, 959, 960, 967, 985, 986, 999